(12) United States Patent
Gurt Santanach et al.

(10) Patent No.: US 10,329,928 B2
(45) Date of Patent: Jun. 25, 2019

(54) ROTOR-STATOR ASSEMBLY FOR A GAS TURBINE ENGINE

(71) Applicant: SAFRAN HELICOPTER ENGINES, Bordes (FR)

(72) Inventors: Julien Gurt Santanach, Saint Vincent de Tyrosse (FR); Fabrice Crabos, Assat (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 668 days.

(21) Appl. No.: 14/434,461

(22) PCT Filed: Oct. 7, 2013

(86) PCT No.: PCT/FR2013/052370
§ 371 (c)(1),
(2) Date: Apr. 9, 2015

(87) PCT Pub. No.: WO2014/057194
PCT Pub. Date: Apr. 17, 2014

(65) Prior Publication Data
US 2015/0267544 A1 Sep. 24, 2015

(30) Foreign Application Priority Data

Oct. 11, 2012 (FR) ...................... 12 59704

(51) Int. Cl.
*F01D 5/28* (2006.01)
*C23C 4/10* (2016.01)
(Continued)

(52) U.S. Cl.
CPC ............ *F01D 5/284* (2013.01); *C04B 35/486* (2013.01); *C04B 35/488* (2013.01); *C23C 4/11* (2016.01);
(Continued)

(58) Field of Classification Search
CPC ........ F01D 11/08; F01D 11/12; F01D 11/122; F01D 11/125; F01D 11/127; F01D 5/284;
(Continued)

(56) References Cited

U.S. PATENT DOCUMENTS

| 4,289,446 A * | 9/1981 | Wallace ................ F01D 11/122 277/415 |
| 4,936,745 A | 6/1990 | Vine et al. |

(Continued)

FOREIGN PATENT DOCUMENTS

| EP | 1 593 757 A1 | 11/2005 |
| EP | 1 642 993 A1 | 4/2006 |

(Continued)

OTHER PUBLICATIONS

International Search Report dated Jan. 21, 2014, in PCT/FR2013/052370, filed Oct. 7, 2013.

*Primary Examiner* — Justin D Seabe
*Assistant Examiner* — Julian B Getachew
(74) *Attorney, Agent, or Firm* — Oblon, McClelland, Maier & Neustadt, L.L.P.

(57) ABSTRACT

A rotor-stator assembly for a gas turbine engine, the assembly including a rotor having a layer of ceramic material forming an abrasive coating deposited on its tip, the layer being constituted mainly by zirconia and possessing a void ratio less than or equal to 15%, and a stator arranged around the rotor and provided facing the tip of the rotor with a layer of ceramic material forming an abradable coating, the layer being constituted mainly by zirconia possessing a void ratio lying in the range 20% to 50% with pores having size less than or equal to 50 μm.

13 Claims, 6 Drawing Sheets

(51) Int. Cl.
  *F01D 25/00* (2006.01)
  *F01D 25/08* (2006.01)
  *F01D 9/02* (2006.01)
  *F01D 11/12* (2006.01)
  *C04B 35/486* (2006.01)
  *C04B 35/488* (2006.01)
  *C23C 4/11* (2016.01)

(52) U.S. Cl.
  CPC ............... *F01D 5/288* (2013.01); *F01D 9/02* (2013.01); *F01D 11/125* (2013.01); *F01D 25/005* (2013.01); *F01D 25/08* (2013.01); *C04B 2235/3224* (2013.01); *C04B 2235/3225* (2013.01); *C04B 2235/386* (2013.01); *C04B 2235/767* (2013.01); *F05C 2203/0895* (2013.01); *F05D 2240/12* (2013.01); *F05D 2240/15* (2013.01); *F05D 2240/307* (2013.01); *F05D 2300/2285* (2013.01); *F05D 2300/502* (2013.01); *F05D 2300/516* (2013.01); *F05D 2300/611* (2013.01); *Y02T 50/6765* (2018.05)

(58) Field of Classification Search
  CPC . F01D 5/286; F01D 5/288; F01D 9/02; F01D 25/005; F01D 25/08; F05D 2240/12; F05D 2240/15; F05D 2240/307; F05D 2300/2285; F05D 2300/502; F05D 2300/516; F05D 2300/611; C23C 4/11; C04B 35/486; C04B 35/488
  See application file for complete search history.

(56) References Cited

U.S. PATENT DOCUMENTS

| | | |
|---|---|---|
| 5,520,516 A | 5/1996 | Taylor et al. |
| 5,743,013 A | 4/1998 | Taylor et al. |
| 2005/0129511 A1 | 6/2005 | Allen |
| 2005/0249602 A1 | 11/2005 | Freling et al. |
| 2008/0219835 A1 | 9/2008 | Freling et al. |
| 2009/0130424 A1* | 5/2009 | Tholen ............... C04B 38/0061 428/312.8 |

FOREIGN PATENT DOCUMENTS

| | | |
|---|---|---|
| GB | 2 226 050 A | 6/1990 |
| JP | 2-196109 A | 8/1990 |
| JP | 2006-104577 A | 4/2006 |
| JP | 2008-215347 A | 9/2008 |

* cited by examiner

ROTOR-STATOR ASSEMBLY FOR A GAS TURBINE ENGINE

BACKGROUND OF THE INVENTION

The present invention relates to the general field of rotor-stator assemblies for a gas turbine engine. The invention relates more precisely to optimizing the microstructures of the abrasive coating and of the abradable coating that are deposited respectively on the tip of a rotor and on the inside surface of a stator surrounding the rotor.

A particular field in which the invention is applicable is that of compressors for aeroengine turbines (in particular for airplane engines or helicopter engines).

An aeroengine compressor comprises a compressor casing made up of one or more annular structures situated facing one or more sets of blades that move with relative rotation between the blades and the annular structures. Likewise, an aeroengine turbine comprises a turbine ring made up of an annular structure constituting a single piece or a plurality of touching ring sectors that surround a set of rotary blades driven by combustion gas.

In order to provide the best possible efficiency for an aeroengine, it is imperative to avoid, or at least minimize, leaks of gas between the tips of the blades and the facing surface of the compressor casing or of the turbine ring, since such leaks do not contribute to the operation of the engine. The search for no clearance or minimum clearance means that it is inevitable that contacts will occur between the tips of the blades and the facing material. Because of the hardness that is usual for this material, such contacts can be damaging to the tips of the blades.

In order to solve that problem, proposals have been made to optimize the abradability of the material situated facing the blades, i.e. its capacity to be worn away physically by the tips of the blades without giving rise to significant wear to the tips. One known technique for this purpose consists in providing the inside surface of the compressor casing or of the turbine ring with a layer forming an abradable coating made of porous material, while also providing the tips of the blades with a layer of dense material forming an abrasive coating.

For the abrasive coating deposited at the tips of the blades, it is thus known to have recourse to a material containing particles of cubic boron nitride (cBN) or of other hard particles of oxide, carbide, or nitride type. Such coatings present satisfactory abrasive behavior when they are associated with an abradable coating that is made of metal or of ceramic. Nevertheless, they present poor durability when they are used at high temperature (these coatings are subject to oxidation and to diffusion into the matrix of the coatings), and they also present thermomechanical behavior that is limited and not compatible with the looked-for lifetimes. Furthermore, it is relatively expensive to deposit such coatings.

For the porous abradable coating deposited on the inside surface of the stator, it is known to use a metal alloy of the MCrAlY type or to use a ceramic based on zirconia. A metal alloy presents the advantage of being easy to make at low cost. In contrast, its abradability properties are relatively poor and its use is temperature limited. Conversely, a zirconia-based ceramic can be used both to perform an abradable coating function and a thermal barrier function. The nature of the oxide-based coating enables it to be used at high temperatures (higher than 1100° C.), since it conserves its physical properties. This coating is also known for being easy to make, inexpensive (deposition by thermal spraying), and for a certain level of porosity, it presents good abradability properties. Nevertheless, such a porous coating presents surface state problems after machining because of the difficulty of shaping and controlling the sizes of the pores and of the grains in the layer. Unfortunately, such a surface state in the stream of air is harmful to the performance of the engine.

In general, although the abradable/abrasive coating pairs known in the prior art, all demonstrate a particular good property among the main looked-for properties (namely: behavior of the system on contacting, ability to withstand erosion, ability to withstand thermal cycling, and good surface state), none of them makes it possible on its own to optimize all of the looked-for properties.

There therefore exists a need to be able to have a pair of coatings available for the abradable material and for the abrasive material that are deposited respectively on the inside surface of the stator and on the tip of the rotor, that is capable of minimizing all of the above-mentioned drawbacks.

OBJECT AND SUMMARY OF THE INVENTION

An object of the present invention is thus to provide a pair of coatings that presents uniform and high-performance behavior for all of the above-mentioned main properties, in particular at high temperature, while also being inexpensive to make.

This object is achieved by a rotor-stator assembly for a gas turbine engine, the assembly comprising:

a rotor having a layer of ceramic material forming an abrasive coating deposited on its tip, said layer being constituted mainly by zirconia and possessing a void ratio less than or equal to 15%; and a stator arranged around the rotor and provided facing the tip of the rotor with a layer of ceramic material forming an abradable coating, said layer being constituted mainly by zirconia possessing a void ratio lying in the range 20% to 50% with pores having size less than or equal to 50 micrometers (μm).

Such an abrasive/abradable coating pair presents numerous advantages. In particular, the Applicant has found that the abrasive coating made of zirconia-based ceramic material possesses particularly high-performance abrasive behavior when it is associated with an abradable coating made of ceramic-based zirconia material having a void ratio lying in the range 20% to 50% with pores of a size less than or equal to 50 μm. Likewise, the Applicant has also found that the abradable coating made of zirconia-based ceramic material in accordance with the invention possesses satisfactory abradable behavior when it is associated with an abrasive coating made of zirconia-based ceramic material.

Furthermore, the abradable coating reveals behavior that is uniform over all contact conditions (namely tangential speed, incursion speed, and temperature) and can be used at high temperature (higher than 1100° C.). It is also a material that performs both the function of a thermal barrier and the function of an abradable coating, and its surface state after machining is satisfactory.

Furthermore, this abrasive/abradable coating pair is easy to make and to repair and it is inexpensive to fabricate. The material based mainly on zirconia can be deposited by thermal spraying, by a sol-gel method, or by sintering for the abradable coating, and these deposition methods are easy to perform.

Preferably, the porosity of the abradable coating layer is shared uniformly within said layer.

The porosity of the abradable coating layer may present distribution that is monomodal with pores of a size less than or equal to 5 µm. Alternatively, the porosity of the abradable coating layer may present a distribution that is bimodal with fine pores of size less than or equal to 5 µm and medium pores of size lying in the range 15 µm to 50 µm.

Furthermore, the abradable coating layer is made up of at least two layer portions having different void ratios. Having porosity that varies with depth in the abradable coating enhances the resistance of the coating to thermal shocks, enhances its resistance to thermal cycling, and increases the insulating power of the coating (it provides a more effective thermal barrier). The abradable coating layer may also include vertical cracks.

Also preferably, the abradable coating layer presents a modulus of elasticity lying in the range 4 gigapascals (GPa) to 10 GPa, and a hardness lying in the range 70 on the Rockwell hardness C scale (HRC) to 95 HRC. Such properties give the abradable coating better resistance to thermal shocks and sufficient erosion resistance while also conserving good abradable character.

Likewise, the abrasive coating layer advantageously presents a modulus of elasticity greater than or equal to 30 GPa and a hardness greater than 600 on the Vickers hardness scale (HV).

Also preferably, the zirconia constituting the abradable coating layer and the abrasive coating layer is doped with yttrium, gadolinium, dysprosium, or any other stabilizer of zirconia in the tetragonal or cubic phase.

The abradable coating layer may be deposited on the stator by thermal spraying, by sintering, or by a sol-gel method. Likewise, the abrasive coating layer may be deposited on the tip of the rotor by thermal spraying, by sintering, by an electrolytic method, by a vapor deposition method, or by a sol-gel method.

The invention also provides a gas turbine engine having at least one rotor-stator assembly as defined above.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

The invention applies to any rotor-stator assembly for a gas turbine engine in which the tip of the rotor comes into contact with the inside surface of the portion of the stator surrounding the rotor.

Figure 1:
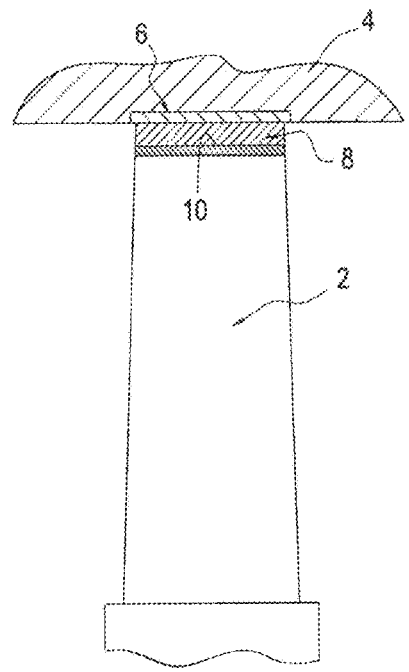
FIG. 1 is a diagrammatic view of an example of a rotor-stator assembly in accordance with the invention.

FIG. 1 is a diagram of an example of an application of the invention in which the rotor is made up of rotary blades 2 of a high pressure turbine in a turbojet and the stator is a turbine ring 4 made as a single piece or made up of a plurality of touching ring sectors surrounding the blades.

In such an assembly, the clearance between the inside surface of the turbine ring 4 and the tips of the blades 2 is zero or almost zero. On the inside, the turbine ring carries an abradable coating 6 into which an abrasive coating 8 deposited on the tips of the blades 2 can penetrate in part without suffering a large amount of wear.

According to the invention, the layer forming the abrasive coating 8 is made of a ceramic material mainly constituted by zirconia and having a void ratio less than or equal to 15%, while the layer forming the abradable coating 6 is made of a ceramic constituted mainly by zirconia and possessing a void ratio lying in the range 20% to 50%, with pores of size less than or equal to 50 µm.

The term "mainly" is used herein to mean that the zirconia of the abradable coating and of the abrasive coating represents at least 80% of the composition of those layers.

The abradable coating 6 and the abrasive coating 8 of the rotor-stator assembly in accordance with the invention are thus made using the same ceramic, namely zirconia, but with microstructures that are different. The zirconia layer constituting the abrasive coating possesses relatively low porosity so as to guarantee the best possible mechanical properties (hardness and resistance to thermal shocks), while the zirconia layer constituting the abradable coating presents a microstructure that is fine (i.e. pores of a size that is less than or equal to 50 µm), and porosity that is controlled so as to enhance the erosion resistance of the coating and so as to guarantee high-performance abradability properties.

For both coatings, the zirconia that is used is advantageously doped (with yttrium, gadolinium, dysprosium, or any other stabilizer of zirconia in tetragonal or cubic phase). Nevertheless, it is not necessary for the composition of the zirconia power forming these coatings to be strictly identical for both coatings. Thus, by way of example, it is possible to add stabilizer agents to one or the other of the powders.

The abrasive coating 8 deposited on the tips of the blades 2 preferably also presents a modulus of elasticity that is greater than or equal to 30 GPa and hardness greater than 600 HV.

The abrasive coating layer may be deposited on the tips of the blades by methods that are known, such as thermal spraying, sintering, the electrolytic method, vapor deposition, or the sol-gel method.

Recourse may also be had to an underlayer 10 in order to facilitate depositing the abrasive coating layer on the tips of blades that are made of metal. For example, the bonding underlayer 10 may be constituted by MCrAlY (where M may be Ni, Co, or NiCo), or by a coating of platinum aluminide.

With reference to FIGS. 2A-2C, 3A-3C, and 4A-4B, there follows a description of various embodiments of microstructures for layers of material forming the abradable coating of the rotor-stator assembly of the invention.

Figure 2A:
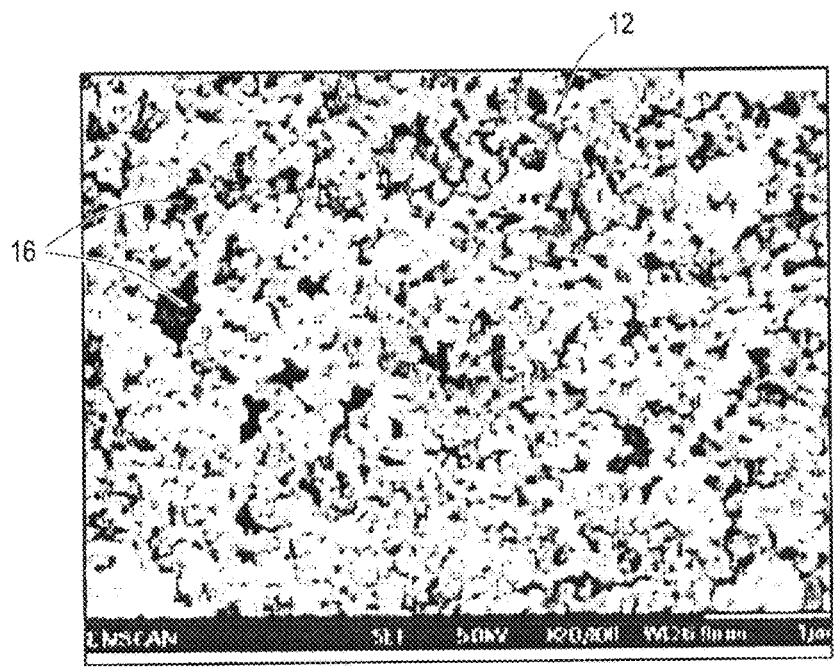
FIGS. 2A-2C, 3A-3C, and 4A-4B show various embodiments of materials suitable for use as abradable coatings for the stator of the FIG. 1 assembly.
Figure 2B:
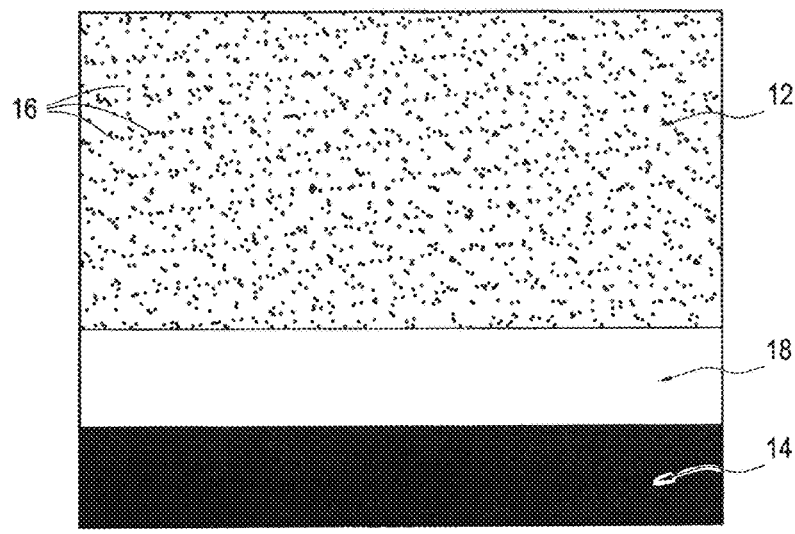

FIGS. 2A and 2B show a first embodiment respectively in the form of a photograph (scale: 1 µm) and in the form of a diagram, for such a layer 12 constituted mainly by zirconia and deposited on a substrate 14. In this embodiment, the porosity (where pores are represented by black dots 16) is said to be fine, i.e. it is constituted by pores of size less than or equal to 5 µm, and uniform in its distribution across the thickness of the layer. In this example, the distribution of the porosity in the layer is monomodal.

It should be observed that this layer 12 may be deposited on the substrate via a bonding underlayer 18, e.g. formed by depositing an alloy of the MCrAlY type (where M is Ni, Co, or NiCo), or depositing a platinum aluminide coating, etc.

Figure 2C:
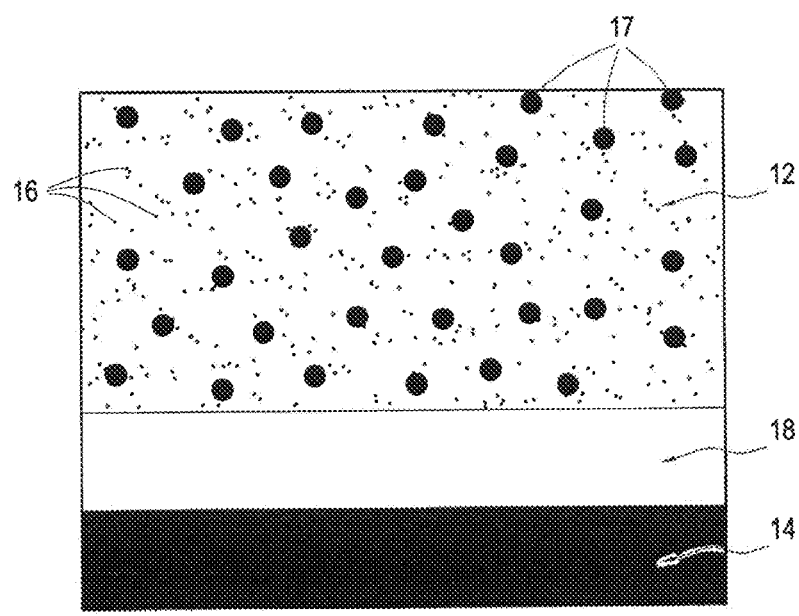

Furthermore, in a variant of this first embodiment shown in FIG. 2C, the layer 12 of zirconia also comprises particles 17 of solid lubricant, such as for example particles of hexagonal boron nitride. Such particles make it easier for the blades to move during rotor-stator contact and they limit forces between the rotor and the stator.

Figure 3A:
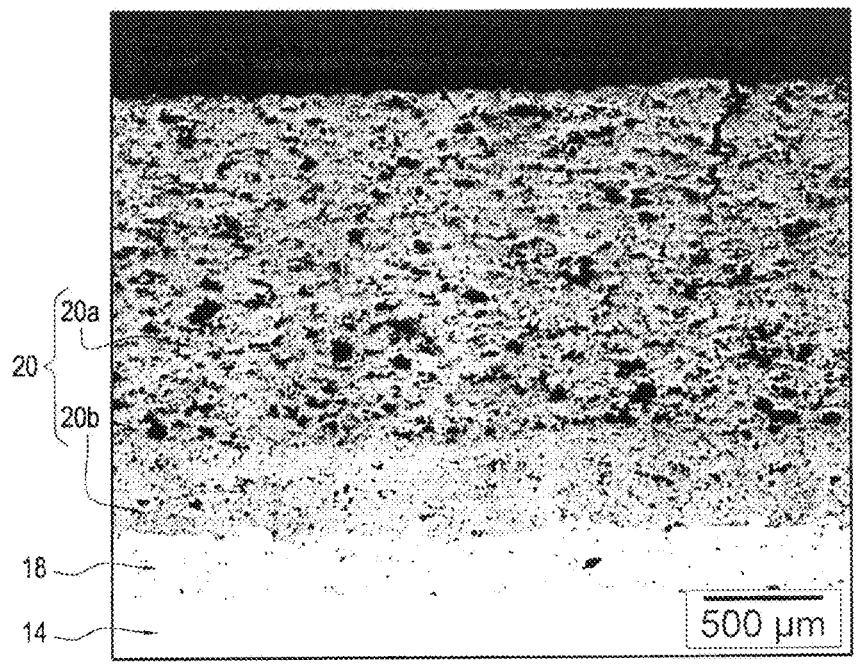
Figure 3B:
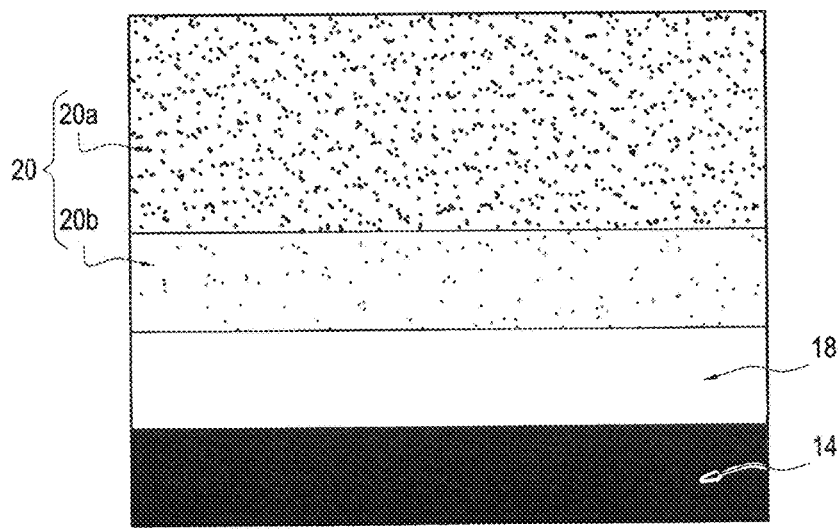
Figure 3C:
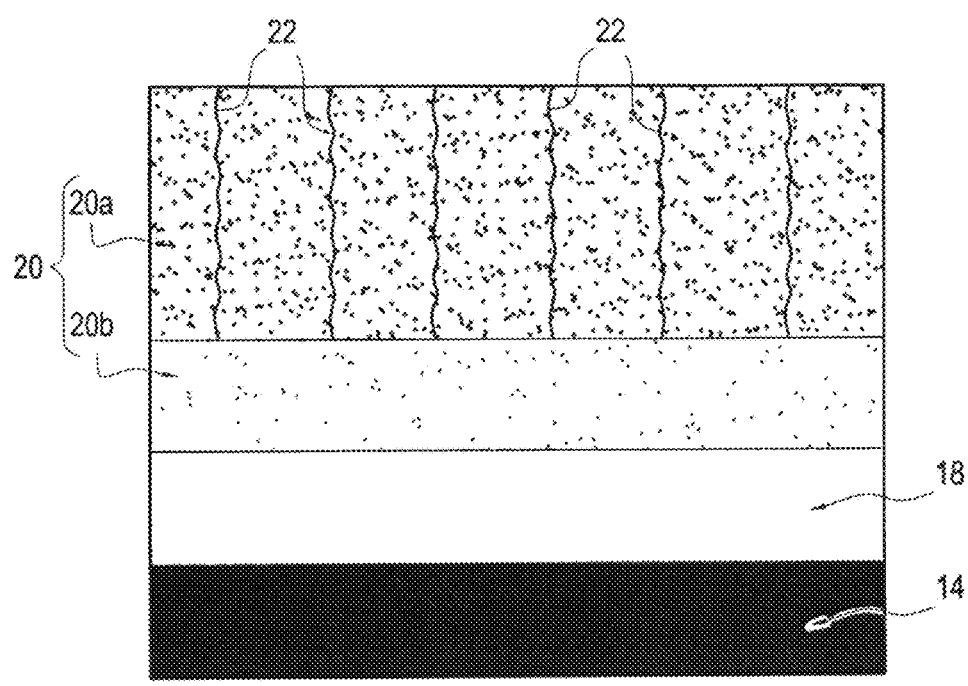

FIGS. 3A to 3C show a second embodiment of a layer 20 deposited on a substrate 14 and suitable for use in constituting the abradable coating of the rotor-stator assembly.

In this second embodiment, the layer 20 is constituted by two layers 20a and 20b of zirconia having different microstructures. Thus, the layer 20a deposited beside the abrasion zone presents porosity that is high (i.e. having a void ratio lying in the range 20% to 50%), while the layer 20b deposited beside the substrate 14 presents lower porosity (of the order of 10% to 20%).

A layer is thus obtained that presents high porosity at the surface in order to act as an abradable coating and a denser underlayer beside the substrate in order to act as a thermal barrier. Such variation in porosity across the depth of the abradable coating serves to improve the resistance of the coating to thermal shocks, to improve its resistance to thermal cycles, and to increase the insulating power of the coating (it provides a thermal barrier that is more effective).

It should be observed that this layer 20 may be deposited on the substrate via an intermediate bonding underlayer 18.

It should also be observed that in each of the two layers 20a and 20b, the pores are preferably distributed in uniform manner throughout the thickness of the layers.

Furthermore, in a variant of this second embodiment, as shown in FIG. 3C, the layer 20a deposited beside the abrasion zone may present an array of vertical cracks 22 (at least two cracks every millimeter), so as to improve the thermomechanical behavior of the coating.

Figure 4A:
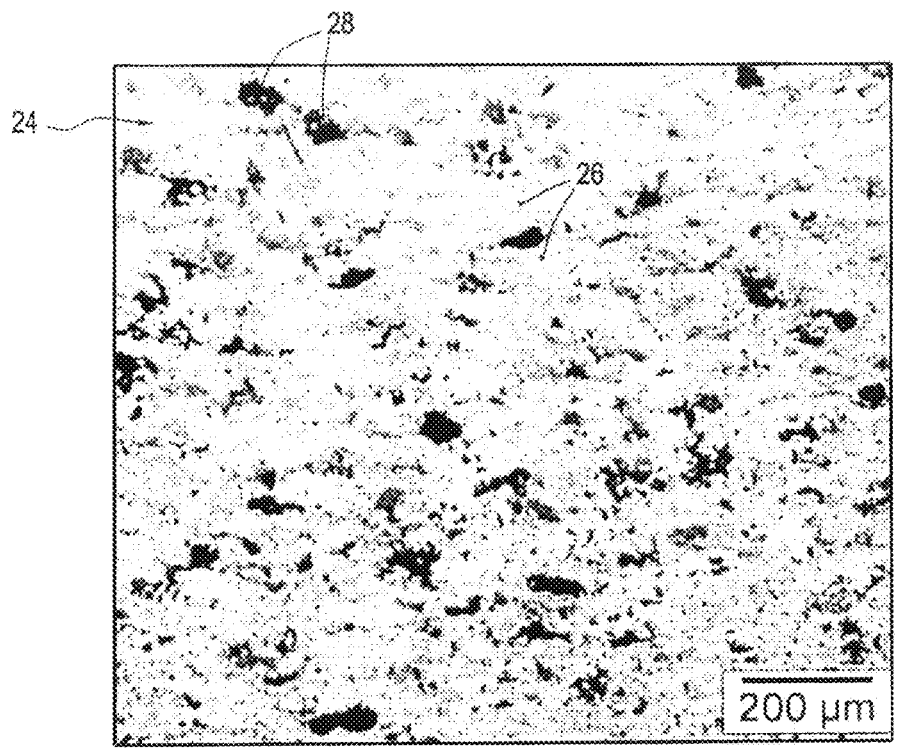
Figure 4B:
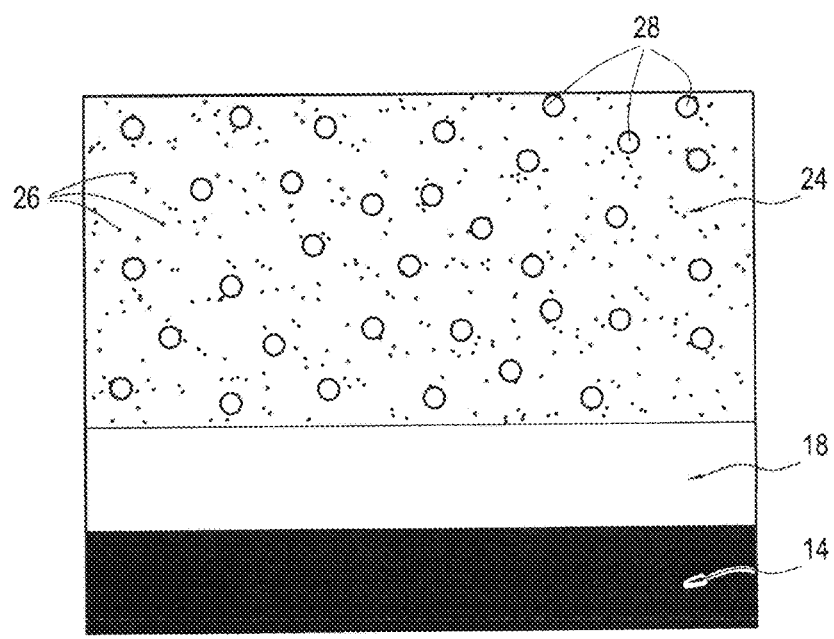

FIGS. 4A-4B show a third embodiment of a layer 24 deposited on a substrate 14 and suitable for use in constituting the abradable coating of the rotor-stator assembly.

In this third embodiment, the layer 24 is formed by a layer of zirconia with high porosity (i.e. having a void ratio lying in the range 20% to 50%).

Compared with the first embodiment, the distribution of porosity in the layer in this example is bimodal, i.e. the pores are shared between "fine" pores (i.e. having size less than or equal to 5 µm), and "medium" pores (i.e. having a size lying in the range 15 µm to 50 µm).

In the photograph of FIG. 4A, the pores of fine size are thus represented by black zones 26, while the pores of medium size are represented by black zones 28. It should be observed that regardless of pore size, the way the pores are distributed in the layer 24 is uniform.

Other characteristics common to the various embodiments of the layer forming the abradable coating of the rotor-stator assembly are described below.

This abradable coating layer preferably presents a modulus of elasticity lying in the range 4 GPa to 10 GPa. Such values give the coating better resistance to thermal shocks.

Also preferably, the abradable coating layer presents hardness lying in the range 70 to 95 on the surface Rockwell hardness scale (HR15Y), thus making it possible to guarantee sufficient resistance to erosion while presenting good abradable character.

Furthermore, the abradable coating layer may be deposited by thermal spraying of an agglomerated powder preferably containing a pore-generating agent and a solid lubricant. It is also possible to have recourse to thermal spraying of a suspension of nanometer powder which facilitates obtaining finer microstructure. Likewise, it is possible to modify the spraying parameters so as to obtain a microstructure with vertical cracks and a void ratio greater than 20%.

Recourse may also be had to deposition by sintering of powders having a submicrometer microstructure with or without a pore-generating agent and a solid lubricant. Sintering provides increased control over the microstructure by shaping the deposit at a temperature lower than the melting temperature of the ceramic. In particular, the microstructure may be conserved as being fine and the porosity may be controlled both in terms of uniformity and in terms of size and distribution.

Recourse may also be had to a sol-gel method for depositing the abradable coating layer.

Figure 5:
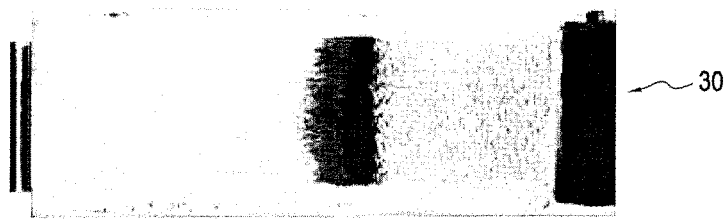
FIGS. 5 and 6 are photographs showing the behavior of the abrasive and abradable coatings during a test, respectively for a prior art rotor-stator assembly and for a rotor-stator assembly in accordance with the invention.
Figure 5:
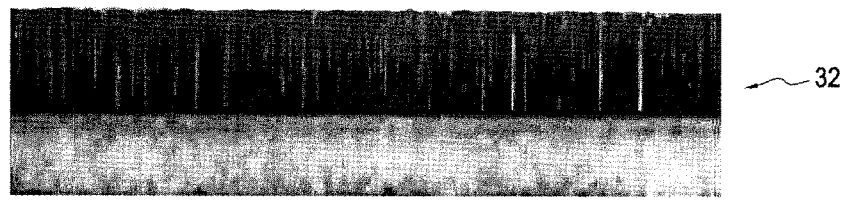
Figure 6:
Figure 6:

With reference to FIGS. 5 and 6, there follows a description of the results of testing abradability and wear for a prior art abrasive/abradable coating pair (FIG. 5) and for an abrasive/abradable coating pair in accordance with the invention (FIG. 6).

These tests were performed using a test bench of the kind made available by the supplier Sulzer Innotec. In known manner, such a test bench comprises both a rotor carrying a blade that is provided at its free end with a layer abrasive coating, and a plate carrying a sample of abradable coating, it being possible to move the plate towards the rotor so as to enable incursion of the abrasive material into the abradable material. The test bench also has a high-speed flame generator for heating the abradable coating during testing.

Tests were performed under the same conditions with the rotor rotating at a speed of 410 meters per second (m/s), with heating of the abradable coating to a temperature of about 1100° C., and with an incursion speed of the abrasive coating into the abradable coating of about 50 micrometers per second (µm/s).

FIG. 5 shows the surface state after testing a prior art abradable coating 30 constituted by dense zirconia (void ratio of about 10%) and a plan view of the tip of a blade (without coating) 32 after contacting the coating.

In this figure, a high degree of wear can be seen at the tip of the blade, with poor contacting in the abradable coating deposited on the stator, together with the presence of material being transferred from the blade to the stator.

FIG. 6 shows the surface state after testing an abradable coating 34 in accordance with the invention and a section view of an abrasive coating 36 in accordance with the invention. In particular, in this test, the abradable coating 34 that was used possessed a void ratio lying in the range 25% to 28% with a microstructure that was fine, being constituted by fine pores and medium pores (bimodal distribution) that were distributed uniformly as described with reference to FIGS. 3A and 3B. Similarly, the abrasive coating 36 made of zirconia partially stabilized with yttrium possessed a void ratio of about 10%.

Compared with FIG. 5, it can be seen in this figure that wear is low in the abrasive coating deposited on the rotor and contact is good in the abradable coating deposited on the stator. This leads to good behavior in terms of abradability and of wear for the abrasive/abradable coating pair of the rotor-stator assembly in accordance with the invention.

The invention claimed is:

1. A rotor-stator assembly for a gas turbine engine, the assembly comprising:
   a rotor including a layer of ceramic material forming an abrasive coating deposited on its tip, said abrasive coating layer being constituted mainly by zirconia and possessing a void ratio less than or equal to 15%; and a stator arranged around the rotor and provided facing the tip of the rotor with a layer of ceramic material forming an abradable coating, said abradable coating layer being constituted mainly by zirconia possessing a void ratio lying in a range 20% to 50% with pores including size less than or equal to 50 μm to control a porosity of the abradable coating layer so as to provide the abradable coating with an erosion resistance, and wherein the porosity of the abradable coating layer presents a distribution that is bimodal with fine pores of a size less than or equal to 5 μm and medium pores of a size lying in a range 15 μm to 50 μm.

2. An assembly according to claim 1, wherein the porosity of the abradable coating layer is shared uniformly within said abradable coating layer.

3. An assembly according to claim 1, wherein the abradable coating layer is made up of at least two layer portions including different void ratios.

4. An assembly according to claim 1, wherein the abradable coating layer presents a modulus of elasticity lying in a range 4 GPa to 10 GPa and a hardness lying in the range 70 HR15Y to 95 HR15Y.

5. An assembly according to claim 1, wherein the abrasive coating layer presents a modulus of elasticity greater than or equal to 30 GPa and a hardness greater than 600 HV.

6. An assembly according to claim 1, wherein the zirconia mainly constituting the abradable coating layer and the abrasive coating layer is doped with a stabilizer of zirconia in a tetragonal or cubic phase.

7. An assembly according to claim 1, wherein the abradable coating layer is deposited on the stator by thermal spraying, by sintering, or by a sol-gel method.

8. An assembly according to claim 1, wherein the abrasive coating layer is deposited on the tip of the rotor by thermal spraying, by sintering, by an electrolytic method, by a vapor deposition method, or by a sol-gel method.

9. An assembly according to claim 1, wherein the rotor is a turbine blade and the stator is a turbine casing.

10. A gas turbine engine including at least one rotor-stator assembly according to claim 1.

11. An assembly according to claim 1, wherein the fine pores and the medium pores are each uniformly distributed in said abradable coating layer.

12. An assembly according to claim 6, wherein the stabilizer of zirconia in the tetragonal or cubic phase is yttrium, gadolinium, or dysprosium.

13. An assembly according to claim 1, wherein the rotor and/or the stator includes an underlayer under the respective abrasive coating layer and/or abradable coating layer, and the underlayer includes an alloy of MCrAlY where M is Ni, Co, or NiCo, or the underlayer includes a platinum aluminide coating.

* * * * *